United States Patent Office 2,885,443
Patented May 5, 1959

2,885,443

WATER-SOLUBLE ACETALS OF GLUTARALDE-HYDE AND METHOD OF MAKING SAME

Bernard H. Kress, Lafayette Hill, Pa., assignor to Quaker Chemical Products Corporation, Conshohocken, Pa., a corporation of Pennsylvania No Drawing. Application April 9, 1956
Serial No. 576,808

4 Claims. (Cl. 260—615)

This invention relates to water-soluble acetals of glutaraldehyde and their preparation.

It is well known that acetals may usually be produced by reacting an alcohol with an aldehyde under acidic conditions of catalysis at an elevated temperature. In order to make the reaction go to completion, it is ordinarily necessary to remove water of dehydration during the operation. A convenient means of carrying out this procedure is by azeotropic distillation with toluene or xylene, or some other suitable solvent. This general reaction may be expressed as follows:

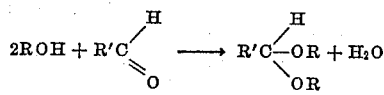

where R and R' represent hydrocarbon radicals which may contain substituent groups that do not interfere with acetal formation. Acetals may be made in this manner from monoaldehydes and from some dialdehydes, but I have found that when glutaraldehyde is employed, this conventional method of acetal formation results only in the production of dark colored viscous polymerization products. This is particularly true when the alcohol used for acetal formation contains more than one hydroxyl group as, for example, ethylene glycol or sorbitol. Moreover, glutaraldehyde is available commercially only in aqueous solution because of its instability in concentrated form. The presence of large volumes of water in commercial grades adds to the difficulty of obtaining useful acetals because of the heat and time required for removal of the water of solution. The viscous and dark colored reaction products of glutaraldehyde and alcohols obtained by conventional methods of acetal formation are only partially soluble in water. Because of both their solubility characteristics and their dark color they are totally unsuitable for use in applications where clear, aqueous solutions are required.

I have now found that water soluble, light-colored acetals of glutaraldehyde can be prepared by reacting polyhydric alcohols with a well-defined derivative of glutaraldehyde, namely, 2-ethoxy-2,3-dihydropyrane. This compound is a stable chemical and is commercially available in anhydrous form. I may use glycols or diglycols, mixtures of glycols or diglycols, or mixtures of these compounds with lower monohydric alcohols such as methanol and ethanol to obtain the water-soluble glutaraldehyde compounds of my invention. Specific polyols which I may use include ethylene glycol, propylene glycol, diethylene glycol, dipropylene glycol, and glycerine.

I believe that the initial reaction which is effected by this means can be represented as follows:

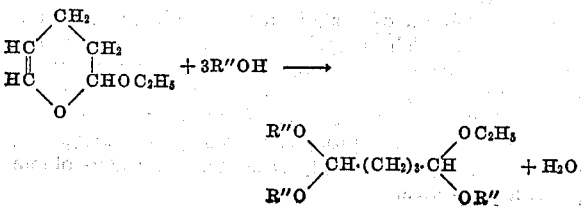

The $C_2H_5$ radical shown in this formula may be replaced by R'', depending upon reaction conditions. R'', represents a saturated aliphatic hydrocarbon radical which bears one or more substituent hydroxyl or ether linkages, derived from the polyols listed above. If methanol is employed as one of my reaction intermediates, then one or more of these R'' groups may be $CH_3$. Moreover, I do not intend to limit myself by this illustrative formula to monomeric acetals. Relatively low molecular weight polymeric condensation products exhibiting low viscosity and light color may also be present. Instead of 2-ethoxy-2,3-dihydropyrane, I may also use other 2-alkoxy-2,3-dihydropyranes where the alkyl group contains from one to four carbon atoms, e.g. methyl, propyl, or butyl.

I have previously found that glutaraldehyde can be reacted with cellulosic materials such, for example, as rayon, cotton, and paper under acidic conditions of catalysis and at moderately elevated temperatures. The reaction products so obtained possess enhanced physical characteristics as compared with the original materials. For example, rayon and cotton fabrics thus treated are dimensionally stabilized with respect to laundering. They also exhibit markedly improved crease resistance. A serious drawback to the practical application of glutaraldehyde for such purposes, however, is to be found in the severe odor and, especially, the lachrymatory effects of glutaraldehyde itself even when used in dilute aqueous solutions for the treatment of fabrics. These effects are so serious as to preclude entirely the industrial use of glutaraldehyde, as such, for the treatment of textiles. On the other hand, acetals of glutaraldehyde do not possess obnoxious odors and do not cause lachrymation. Therefore, the products of my invention have wide application in the treatment of cellulosic materials to obtain the effects described above. They may also be employed to increase the wet strength of paper and for other purposes to be enumerated below.

It is obvious that the most economical use of the glutaraldehyde component of these acetals will be made when the relative weight proportion of the alcoholic components is held to a minimum. It will, therefore, be advantageous at times to employ methyl alcohol in admixture with other hydroxyl bearing compounds in the preparation of my acetals. This will be apparent from the following Example I which shows the preferred embodiment of my invention.

EXAMPLE I

|  | Parts |
|---|---|
| Diethylene glycol | 35.55 |
| 2-ethoxy-2,3-dihydropyrane | 42.95 |
| Methanol | 21.46 |
| p. Toluene sulfonic acid | 0.04 |

The admixture is heated until an exothermic reaction occurs. The product is then refluxed for an hour. A pale straw-colored liquid acetal is obtained which has a slight penetrating odor and which is soluble in water.

Although I prefer to use methyl alcohol as a component of my glutaraldehyde acetals in conjunction with polyols, I am not restricted by such use. Acetals suitable for the purposes enumerated above can also be obtained by using a dial alone or in combination with other polyhydric alcohols. The use of ethylene glycol, only, is shown in Example II, while Example III illustrates the use of a polyhydric alcohol containing more than two hydroxyl groups.

EXAMPLE II

| | | |
|---|---|---|
| 2-ethoxy-2,3-dihydropyrane | mols | 1 |
| Ethylene glycol | do | 2 |
| p. Toluene sulfonic acid | gm | 0.05 |

The above mixture is treated as in Example I to produce a light-colored acetal.

EXAMPLE III

| | | |
|---|---|---|
| Glycerine | moles | 1.0 |
| 2-ethoxy-2,3-dihydropyrane | do | 1.0 |
| p. Toluene sulfonic acid | g | 0.01 |

The above mixture was heated to reflux when an exothermic reaction occurred. Then, after the reaction had subsided, 2 moles of methanol were added and the reaction refluxed 1 hour. A light yellow water-soluble product was obtained.

The remarkable crease-proofing and dimensional stabilization which can be effected by reacting the acetals of this invention with cellulosic fabrics is shown in Examples IV and V where their application to cotton sheeting is described.

EXAMPLE IV

A padding bath was made up as follows, the parts being given by weight:

| | Percent |
|---|---|
| The acetal of Example I | 10 |
| Magnesium chloride | 2 |
| Water | 88 |

Cotton sheeting, 80 square, was padded through this bath at 100% pickup at room temperature, dried at 180° F. and cured at 300° F. for 5 minutes. The treated fabric had a Monsanto reading of 260° (warp and fill) whereas the untreated fabric had a Monsanto reading of 160°. The crease-resistant test was tentative Test Method 66–53 A.A.T.C.C. Furthermore, the treated sample showed a shrinkage of 1.5% when washed at the temperature of boiling water (A.A.T.C.C. 1953 Standard Test 4–52) whereas the untreated fabric showed a shrinkage of 4.5% by the same test. The treated fabric showed no chlorine retention according to A.A.T.C.C. Tentative Test 69–52.

EXAMPLE V

Treatment comparable to that described in Example IV was given to cotton sheeting, 80 square, using ten percent of the acetal in Example I and two percent of a catalyst consisting of a mixture of formic acid and magnesium chloride in a ratio of three to one. The treated fabric had a Monsanto reading of 250° (warp and fill) as compared with a Monsanto reading of 153° for the untreated fabric. After one wash, as described in Example IV, the warp shrinkage was 1% as compared with 4.1% for the untreated fabric.

The application of my glutaraldehyde acetals to paper for purposes of imparting wet strength is illustrated in Example VI.

EXAMPLE VI

Pure filter paper was impregnated with a solution containing 1% of the product of Example I and 0.5% of aluminum sulfate as catalyst. It was dried at 180° F. and then cured for five minutes at 300° F. The following values for tensile strength were obtained when treated and untreated paper was tested according to the method described in "Wet Strength in Paper and Paperboard," TAPPI Monograph Series #13 (1954), published by the Technical Association of the Pulp and Paper Industry, New York City.

| | Untreated | Treated |
|---|---|---|
| Dry strength (lbs.) | 6.69 | 6.97 |
| Wet strength (lbs.) | 0.49 | 3.97 |
| Wet strength (Percent of dry strength) | 7.40 | 57.0 |

I have already described how the products made in accordance with this invention may be used as textile treating agents to obtain dimensional control and crease recovery on rayon and cotton fabrics. They may also be applied to non-woven fabrics for similar purposes. When paper is treated with these materials, its wet strength is increased. Moreover, the gluteraldehyde acetals of this invention may be used as effective insolubilizers for starch and starch derivatives. They may also be used to insolubilize polyvinyl alcohol and to render polyvinyl acetate insensitive to water. The effects obtained with starch and various starch derivatives, such as hydroxyethyl starch and oxidized and hydrolyzed starches, and the effects obtained with polyvinyl alcohol and polyvinyl acetate can be obtained with these materials alone such, for example, as in film form, or when they are applied to fabrics, for example, as textile finishes. These effects are also apparent when these various materials are utilized in paper products. Water-soluble derivatives of cellulose such, for example, as hydroxyethyl cellulose may also be utilized in conjunction with these glutaraldehyde acetals in obtaining permanent effects. Table I shows the warp shrinkage after one wash and the Monsanto reading, as described in Example IV, when cotton sheeting, 80 square, is treated as described in Example IV.

Table I

| Size (Percent Solids) | Catalyst (2% Concentration) | Warp Shrinkage, Percent (after 1—212° F. wash) | Monsanto Reading, Degrees (Warp and Fill) |
|---|---|---|---|
| Hydroxyethyl Cellulose ("Avcoset WS") 2% | FMX* | 0.4 | 256 |
| Same | MgCl₂ | 0.7 | 238 |
| Hydroxyethyl starch ("Penford Gum 380") 2% | FMX | 0.5 | 234 |
| Same | MgCl₂ | 0.8 | 243 |
| Hydroxyethyl starch (Solvitose HDF) 2% | FMX | 0.7 | 250 |
| Same | MgCl₂ | 1.1 | 220 |
| Polyvinyl Alcohol ("Elvanol 52-22") 1% | FMX | 0.6 | 257 |
| Same | MgCl₂ | 0.4 | 233 |
| Pearl Corn Starch 1% | FMX | 0.6 | 257 |
| Same | MgCl₂ | 0.7 | 236 |
| Corn Dextrine | FMX | 0.5 | 259 |
| Same | MgCl₂ | 0.7 | 253 |
| Water Blank, no acetal | None | 4.0 | 158 |

*FMX indicates a catalyst mixture consisting of 3 parts of formic acid to one of magnesium chloride.

It is known to the art that certain aldehydes such, for example, as formaldehyde or glyoxal can be reacted with cellulosic fabrics in order to stabilize them dimensionally. It has heretofore, however, not been possible to utilize aldehydes except in the form of resinous materials where combined with urea or melamine to enhance the crease resistance and crush proofness of cellulosic textiles. Fabrics thus treated retain chlorine upon bleaching and serious tendering of the material is caused by supsequent gradual elimination of hydrochloric acid as, for example, during wet ironing. It will be apparent from the preceding description of my invention that I have provided a means, through these water-soluble derivatives of glutaraldehyde, for creating crease resistance characteristics in otherwise readily crushable fabrics. At the same time my treatment yields textile materials which are not subject to the disadvantage of chlorine retention with resultant loss of tensile strength. By means of the products of this invention I have, moreover, provided a method of obtaining non-chlorine retentive effects without the severe problems of odor, lachrymation, and color, which would otherwise be attendant upon the use of glutaraldehyde itself.

I claim:

1. The method of making a water-soluble condensation product which comprises heating under acidic conditions 2-ethoxy-2,3-dihydropyrane with an alcohol selected from the group consisting of methanol and ethanol and also a polyol selected from the group consisting of ethylene glycol, propylene glycol, diethylene glycol, dipropylene glycol, and glycerine until a water-soluble product is formed.

2. A water-soluble acetal of glutaraldehyde, methanol and diethylene glycol made in accordance with the method of claim 1.

3. The method of making a water-soluble condensation product which comprises heating under acidic conditions 2-ethoxy-2,3-dihydropyrane with a polyol selected from the group consisting of ethylene glycol, propylene glycol, diethylene glycol, dipropylene glycol, and glycerine until a water-soluble product is formed.

4. A water-soluble acetal of glutaraldehyde and diethylene glycol made in accordance with the method of claim 3.

References Cited in the file of this patent

UNITED STATES PATENTS

| | | |
|---|---|---|
| 2,031,619 | Seymour | Feb. 25, 1936 |
| 2,350,350 | Gresham | June 6, 1944 |

FOREIGN PATENTS

| | | |
|---|---|---|
| 698,736 | Great Britain | Oct. 21, 1953 |
| 718,502 | Great Britain | Nov. 17, 1954 |